US011203984B2

(12) United States Patent
Ueno et al.

(10) Patent No.: US 11,203,984 B2
(45) Date of Patent: Dec. 21, 2021

(54) JET ENGINE, FLYING OBJECT, AND METHOD OF OPERATING A JET ENGINE

(71) Applicant: MITSUBISHI HEAVY INDUSTRIES, LTD., Tokyo (JP)

(72) Inventors: Yoshihiko Ueno, Tokyo (JP); Shojiro Furuya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 585 days.

(21) Appl. No.: 15/121,187

(22) PCT Filed: Feb. 18, 2015

(86) PCT No.: PCT/JP2015/054476
§ 371 (c)(1),
(2) Date: Aug. 24, 2016

(87) PCT Pub. No.: WO2015/151621
PCT Pub. Date: Oct. 8, 2015

(65) Prior Publication Data
US 2017/0009665 A1    Jan. 12, 2017

(30) Foreign Application Priority Data
Mar. 31, 2014  (JP) .............................. JP2014-074491

(51) Int. Cl.
*F02C 9/00* (2006.01)
*F02C 9/32* (2006.01)
(Continued)

(52) U.S. Cl.
CPC ................ *F02C 9/32* (2013.01); *B64D 33/02* (2013.01); *F02C 7/04* (2013.01); *F02C 7/222* (2013.01);
(Continued)

(58) Field of Classification Search
CPC .... F02C 9/32; F02C 447/222; F02C 447/232; F02K 7/14; F02K 7/18; F02K 7/10;
(Continued)

(56) References Cited

U.S. PATENT DOCUMENTS 3,448,947 A * 6/1969 Woodrow ................. G06G 7/80
244/182
3,667,233 A    6/1972 Curran et al.
(Continued)

FOREIGN PATENT DOCUMENTS

DE    1 800 611    5/1970
GB      914906    1/1963
(Continued)

OTHER PUBLICATIONS

Cook, Robert, Interpreting Piping and Instrumentation Diagrams, Sep. 22, 2010.*
(Continued)

*Primary Examiner* — Edwin Kang
(74) *Attorney, Agent, or Firm* — Wenderoth, Lind & Ponack, L.L.P.

(57) ABSTRACT

A jet engine has an inlet which takes in air, a combustor which combusts fuel by using the air, and a fuel control section which controls supply of the fuel. The combustor has a fuel supplying section which supplies the fuel, injectors which inject the fuel. Each injector contains openings which inject the fuel. The fuel supplying section supplies the fuel to the injector in a flow rate according to a command of an autopilot. The fuel control section controls the injectors such that the number of the openings which inject the fuel or flow-path cross-section areas of the pipes which send the fuel in case of the low-speed is more than the number of the (Continued)

openings which inject the fuel or the flow-path cross-section areas of the pipes which send the fuel in case of the high-speed.

9 Claims, 12 Drawing Sheets

(51) Int. Cl.
| | |
|---|---|
| *F02C 7/232* | (2006.01) |
| *B64D 33/02* | (2006.01) |
| *F23R 3/28* | (2006.01) |
| *F02K 7/18* | (2006.01) |
| *F02C 9/44* | (2006.01) |
| *F23N 1/00* | (2006.01) |
| *F02K 7/14* | (2006.01) |
| *F02C 7/04* | (2006.01) |
| *F02C 7/22* | (2006.01) |
| *F02K 7/00* | (2006.01) |

(52) U.S. Cl.
CPC ............... *F02C 7/232* (2013.01); *F02C 9/44* (2013.01); *F02K 7/00* (2013.01); *F02K 7/14* (2013.01); *F02K 7/18* (2013.01); *F23N 1/002* (2013.01); *F23R 3/28* (2013.01); *F05D 2220/323* (2013.01); *F05D 2220/80* (2013.01); *F05D 2240/35* (2013.01); *F05D 2250/90* (2013.01); *F05D 2270/306* (2013.01); *F23N 2237/02* (2020.01); *F23N 2237/10* (2020.01); *F23N 2241/20* (2020.01)

(58) Field of Classification Search
CPC ... F02K 7/16; F02K 9/78; F23N 1/002; F23R 3/28; B64D 33/02; F05D 2220/323; F05D 2240/35; F05D 2250/90; F05D 2270/306
See application file for complete search history.

(56) References Cited

U.S. PATENT DOCUMENTS

| | | | | |
|---|---|---|---|---|
| 4,327,886 A | * | 5/1982 | Bell | F02K 7/18 |
| | | | | 137/15.1 |
| 4,381,642 A | * | 5/1983 | Giles, Jr. | F02K 7/18 |
| | | | | 60/204 |
| 9,726,115 B1 | * | 8/2017 | Hewitt | F02K 9/26 |
| 2003/0205042 A1 | * | 11/2003 | Walker | F02C 9/28 |
| | | | | 60/204 |

FOREIGN PATENT DOCUMENTS

| | | | |
|---|---|---|---|
| JP | 8-219408 | | 8/1996 |
| JP | 2012-13007 | | 1/2012 |
| JP | 2012-144984 | | 8/2012 |
| JP | 2012144984 A | * | 8/2012 |
| JP | 2012144984 A | * | 8/2012 |
| JP | 2012-202226 | | 10/2012 |
| JP | 2013-60891 | | 4/2013 |

OTHER PUBLICATIONS

Bates, Stephen, Solid Hydrogen Fueling of an Air Breathing Supersonic Combustor, 2013 (Year: 2013).*
Aerospaceweb.org, Mach vs. Altitude Tables, 2013 (Year: 2013).*
The Engineering Toolbox, U.S Standard Atmosphere, 2013 (Year: 2013).*
International Preliminary Report on Patentability dated Oct. 4, 2016 in corresponding International Application No. PCT/JP2015/054476.
International Search Report dated May 26, 2015 in corresponding International Application No. PCT/JP2015/054476.
Extended European Search Report dated Feb. 17, 2017 in corresponding European Application No. 15773405.4.

* cited by examiner

| FLIGHT SPEED | FUEL INJECTOR | | | | |
|---|---|---|---|---|---|
| | 1 | 2 | 3 | 4 | 5 |
| LESS THAN $V_0$ | ○ | ○ | ○ | ○ | ○ |
| MORE THAN $V_0$ | × | ○ | ○ | ○ | × |

| FLIGHT SPEED | FUEL INJECTOR | | | | |
|---|---|---|---|---|---|
| | 1 | 2 | 3 | 4 | 5 |
| LESS THAN $V_0$ | ○ | ○ | ○ | ○ | ○ |
| MORE THAN $V_0$ | ○ | × | ○ | × | ○ |

JET ENGINE, FLYING OBJECT, AND METHOD OF OPERATING A JET ENGINE

TECHNICAL FIELD

The present invention relates to a jet engine, a flying object and a method of operating a jet engine.

BACKGROUND ART

As a jet engine of a fuselage which can fly faster than the velocity of sound, a ram jet engine and a scram jet engine are known. These types of jet engines take in air and operate. In the ram jet engine, the inside of the combustor is subsonic. In the scram jet engine, the inside of the combustor is supersonic. In any case, it is important to prevent flame extinguishment due to blowing out (flame stabilization impossible state).

As a flame stabilizing mechanism which keeps a flame for combustion in the jet engine, methods of using a low-speed region which exists in a boundary layer on a wall surface of the combustor, and around a flame stabilizer installed on the wall surface of the combustor are known. In order to realize the flame stabilization by these methods, it is necessary that the fuel is diffused for an appropriate region in the neighborhood of the wall surface of the combustor ("a flame stabilization possible region").

FIG. 1 is a sectional view schematically showing the structure of a jet engine. The jet engine 102 has a fuselage 110 and a cowl 140 provided below the fuselage 110 to form a space 150 through which gas is possible to pass. A front lower part of the fuselage 110 and a front part of the cowl 140 configure an inlet 111 which introduces air into the space 150. The lower part in the middle of the fuselage 110 and the middle part of the cowl 140 configure a combustor 112 that mixes and combusts fuel and air. The rear lower part of the fuselage 110 and the rear part of the cowl 140 configure a nozzle 113 which expands and emits a combustion gas. The combustor 112 has a fuel injector 120. The fuel injector 120 is provided on a wall surface 121 at a part corresponding to the combustor 112 in the lower part of the fuselage 110. Moreover, a flame stabilizer may be provided on the wall surface 121 behind the fuel injector 120 (not shown). The fuel injector 120 injects fuel G for the space 150. The jet engine 102 mixes the air taken in from the inlet 111 and the fuel G injected from the fuel injector 120 and combusts the mixture in the combustor 112. The jet engine 102 expands the combustion gas in the nozzle 113 and emits it backwardly from the fuselage 110. About the flame stabilization in the combustor 112, a part of the fuel G is supplied and diffused toward a low-speed region which exists in the boundary layer developed on the wall surface 121 of the combustor 112, and the flame stabilization is carried out. When the flame stabilizer exists, a part of the fuel G is supplied and diffused toward the low-speed region which exists around the flame stabilizer arranged on the wall surface 121 of the combustor 112, and the flame stabilization is carried out.

A supersonic combustor is disclosed in Patent Literature 1 (JP H08-219408A) as a related art. The supersonic combustor has a strut of a wedge-shaped cross-section, a plurality of fragments and an injection nozzle. The strut of the wedge-shaped cross-section is arranged to direct the acute-angled section to the upper stream in the flow path of the supersonic air flow and has a rear end surface almost orthogonal to the flow path. The plurality of fragments are provided for the rear end surface of the strut to have almost a same width as the rear end surface and to extend to the lower side. The injection nozzle is provided between the fragments of the strut to inject the fuel for the lower stream.

CITATION LIST

[Patent Literature 1] JP H08-219408A

SUMMARY OF THE INVENTION

A subject matter of the present invention is to provide a jet engine, a flying object and a method of operating a jet engine, in which it is possible to stably operate even in case of further lower speed. Also, another optional and additional subject matter of the present invention is to provide a jet engine, a flying object and a method of operating a jet engine, in which it is possible to restrain that the fuel reaches a region where the flame stabilization is difficult.

A jet engine according to some embodiments has an inlet configured to take in air; a combustor configured to combust fuel by using the air; and a fuel control section configured to control supply of the fuel. The combustor has a fuel supplying section configured to supply the fuel; an injector having an opening configured to inject the fuel supplied from the fuel supplying section; a pipe configured to send out the fuel from the fuel supplying section to the opening; and a flow-path cross-section area adjusting section provided for the pipe. The fuel control section controls the fuel supplying section in response to a command of an autopilot to supply a total flow rate of the fuel to the injector. The fuel control section controls the flow-path cross-section area adjusting section to change the cross-section area of the pipe, such that a penetration height of the fuel is controlled.

A method of operating a jet engine which has an inlet configured to take in air; a combustor configured to combust fuel by using air; and a fuel control section configured to control supply of the fuel. The combustor has a fuel supplying section configured to supply the fuel; an injector having an opening configured to inject the fuel supplied from the fuel supplying section to the opening; a pipe through which the fuel is sent out from the fuel supplying section to the opening; and a flow-path cross-section area adjusting section provided for the pipe. The method of operating the jet engine includes supplying, by the fuel supplying section, the fuel to the injector in a total flow rate of the fuel in response to a command of an autopilot; and controlling the flow-path cross-section area adjusting section such that a flow-path cross-section area of the pipe is changed such that the fuel passes through a flame stabilization possible region.

The present invention can provide a jet engine, a flying object and a method of operating a jet engine, in which it is possible to stably operate even in case of lower-speed. Also, optionally and additionally, the present invention can provide a jet engine, a flying object and a method of operating a jet engine, in which it is possible to restrain that the fuel reaches a region where the flame stabilization is difficult.

BRIEF DESCRIPTION OF THE DRAWINGS

The attached drawings are incorporated into this Specification to help the description of embodiments. Note that the drawings should not be interpreted to limit the present invention to examples having illustrated and examples having described.

FIG. 10 is a diagram showing an example of a table indicative of relation between the opening/closing of valves by the fuel injection controller and the flight speed.

FIG. 12 is a diagram showing another example of a table indicative of relation between the opening/closing of valves by the fuel injection controller and the flight speed.

DESCRIPTION OF THE EMBODIMENTS

Hereinafter, a jet engine and a method of operating a jet engine according to embodiments will be described with reference to the attached drawings. In this case, an example in which the jet engine is applied to a flying object will be described. In the following detailed description, many detailed specific items will be disclosed for the purpose of description in order to provide the comprehensive understanding of embodiments. However, it would be apparent that one or plural embodiments are executable without these detailed specific items.

(Items Recognized by the Inventors)

First, important terms are defined in this Specification.

Figure 1:
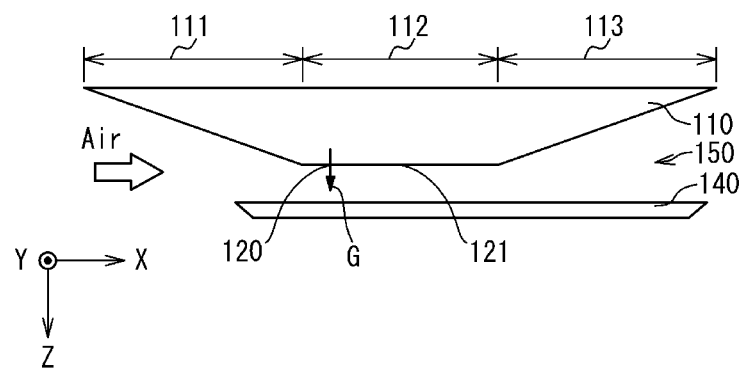
FIG. 1 is a sectional view schematically showing the configuration of a jet engine.

A "penetration height" of fuel is defined, when fuel is injected from a fuel injector to a direction perpendicular to an air flow direction, as a diffusion distance of the fuel in the perpendicular direction. For example, in FIG. 1, when being injected from the fuel injector 120 to the perpendicular direction (+Z direction), the fuel G diffuses in the flow direction (+X direction) of air Air, while diffusing in the perpendicular direction (+Z direction). Here, the diffusion distance of the fuel G in the perpendicular direction (+Z direction) is the "penetration height" of fuel G.

Also, a "momentum flux of air" is defined as a product of a mass of air passing through a unit area perpendicular to the air flow direction for every unit time and the speed of the air.

Also, a "momentum flux of fuel" is a momentum of fuel immediately after being injected from a fuel injection port, and is defined as a product of a mass of fuel passing through the unit area perpendicular to the injection direction for every a unit time immediately after the injection and an injection speed of fuel.

Figure 2:
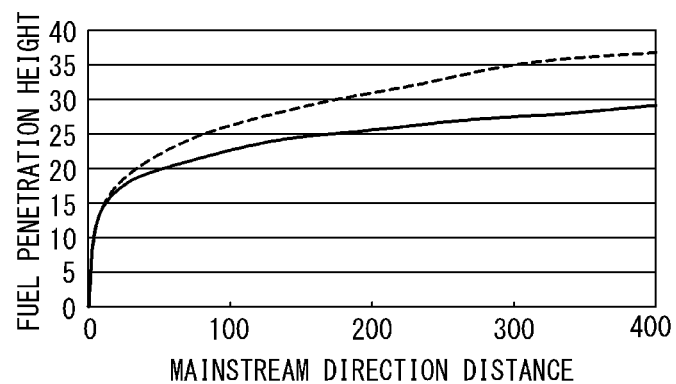
FIG. 2 is a graph showing a relation of penetration height of fuel and distance drifted due to air.

FIG. 2 is a graph showing a relation of the penetration height of fuel G and a distance of fuel G drifted by air Air. The vertical axis shows the penetration height of fuel G (+Z direction; an optional unit) and the horizontal axis shows a distance of the fuel G drifted with the air Air (+X direction; an optional unit). The references (0) of the horizontal and vertical axes show the position of the fuel injector 120. The broken line shows a case that the speed of the flying object is slow (the momentum flux of air Air is small), and the solid line shows a case that the speed of the flying object is fast (the momentum flux of air Air is large). Here, it is supposed that the mass flow rate ratio of the air Air and the fuel G and a momentum flux of the injected fuel G in the perpendicular direction (the +Z direction) are same regardless of the speed of the flying object.

As shown in FIG. 2, when the flight speed is fast (solid line: mainly, in a cruising stage), the penetration height tends to become low. It could be considered that this is because the momentum flux of air Air in the flow direction is large so that the fuel G is easy to be drifted to the air flow direction. On the other hand, when the flight speed is slow (broken line: mainly, in an acceleration stage), the penetration height tends to become high. It could be considered that this is because the momentum flux of air Air is small so that the fuel G is difficult to be drifted to the air flow direction.

Figure 3A:
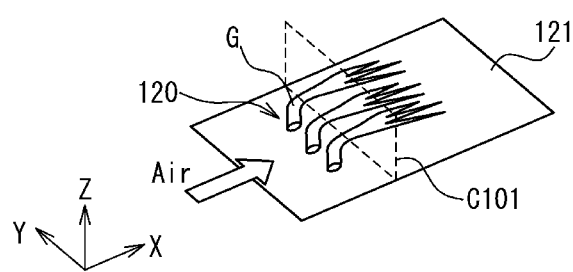
FIG. 3A is a diagram schematically showing the state of fuel injection in a combustor when the flight speed is fast.
Figure 3B:
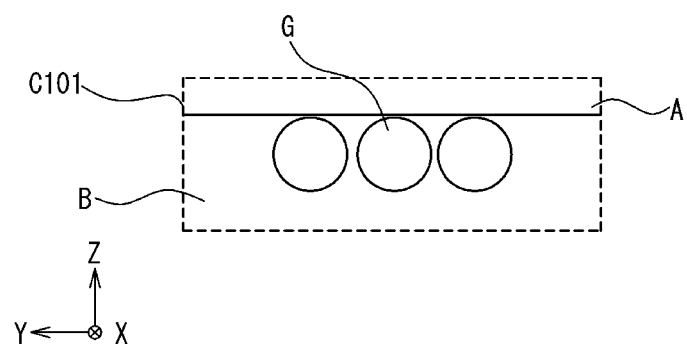
FIG. 3B is a diagram schematically showing the state of the fuel injection in the combustor when the flight speed is fast.

FIG. 3A and FIG. 3B are diagrams schematically showing a state of fuel injection in a combustor when the flight speed is fast. Here, FIG. 3A is a perspective view showing the neighborhood of the openings of the fuel injector 120, and FIG. 3B is the diagram showing the state of the fuel G in a cross-section C101 shown in FIG. 3A. Also, the cross-section C101 is an YZ cross-section in a position apart by a given distance in the air flow direction from the fuel injector 120 in the flow path of air Air and fuel G. Components are shown upside down in these drawings, as compared with FIG. 1.

As shown in FIG. 3A, the fuel G is supplied to the perpendicular direction (+Z direction) from the plurality of fuel injection ports of the fuel injector 120 which are provided on the wall surface 121 of the combustor 112. After that, the fuel G is drifted to the flow direction (+X direction)

by the air Air taken-in from the inlet 111. At that time, as shown in FIG. 3B, the fuel G passes through a region B which is possible to stabilize the flame (flame stabilization possible region) in the cross-section C101 (YZ cross-section), but never passes through a region A which is difficult to stabilize flame (flame stabilization difficult region). This is because the flight speed is fast and the momentum flux of air Air is large, so that the penetration height of fuel G is low (FIG. 2).

Figure 4A:
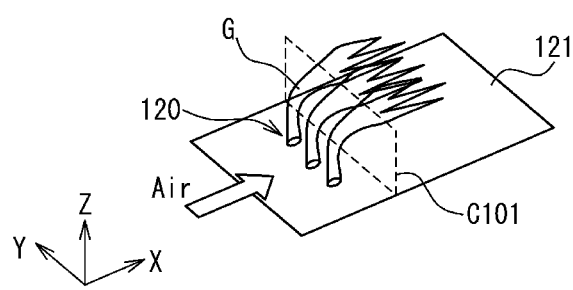
FIG. 4A is a diagram schematically showing the state of the fuel injection in the combustor when the flight speed is slow.
Figure 4B:
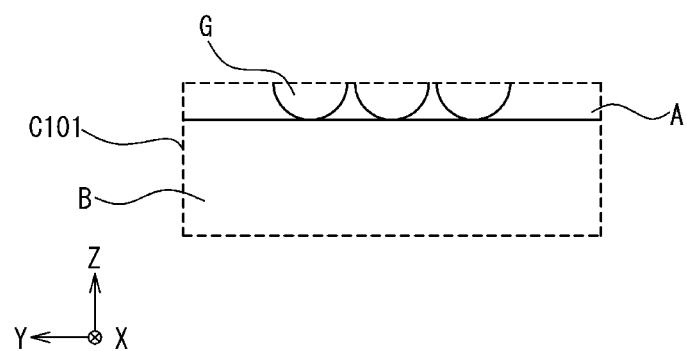
FIG. 4B is a diagram schematically showing the state of the fuel injection in the combustor when the flight speed is slow.

FIG. 4A and FIG. 4B are diagrams schematically showing the state of the fuel injection in the combustor when the flight speed is slow. Here, FIG. 4A is a perspective view showing the neighborhood of the openings of the fuel injector 120, and FIG. 4B is a diagram showing the state of the fuel G in the cross-section C101 of FIG. 4A. Components are shown upside down in these drawings, as compared with FIG. 1.

As shown in FIG. 4A, the fuel G is supplied to the perpendicular direction (+Z direction) from the plurality of fuel injection ports of the fuel injector 120 as in FIG. 3A. After that, the fuel G is drifted to the flow direction (+X direction) by the air Air. At that time, as shown in FIG. 4B, the fuel G passes through the flame stabilization difficult region A and cannot pass through the flame stabilization possible region B in the cross-section C101 (YZ cross-section), different from the case of FIG. 3B. This is because the flight speed is slow and the momentum flux of air Air is small, so that the penetration height of the fuel G becomes high (Referring to FIG. 2 if necessary). In this case, the flame stabilization cannot be accomplished, and there is a possibility that the operation of the jet engine 102 becomes impossible. Therefore, it becomes difficult to use the jet engine 102 at a lower speed.

The configuration of the flying object 1 according to the present embodiment will be described.

Figure 5:
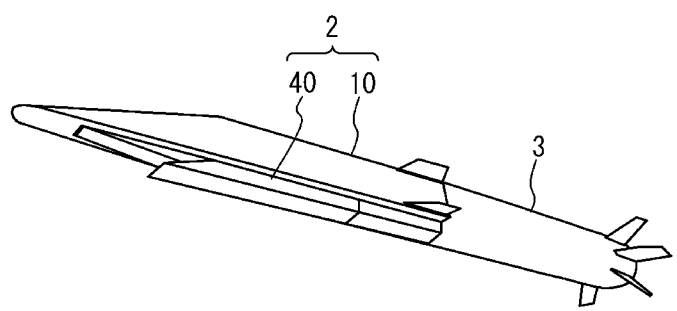
FIG. 5 is a perspective view showing a structural example of a flying object according to an embodiment.

FIG. 5 is a perspective view showing a structural example of the flying object 1 according to the present embodiment. The flying object 1 has a jet engine 2 and a rocket motor 3. When the flying object 1 is launched from a launcher, the rocket motor 3 accelerates the flying object 1 from an initial speed at the time of flight start to a desired speed. However, when the flying object 1 is launched from the launcher in a stationary state, the speed at the time of flight start is zero. When the flying object is launched from the launcher of a traveling vehicle (or a flying body) in the traveling (flying) state, the initial speed is a traveling speed (or a flight speed) of the traveling vehicle (or the flight body). The jet engine 2 accelerates the flying object 1 after the flying object 1 separates the rocket motor 3, and the flying object 1 flies for a target. The jet engine 2 has a fuselage 10 and a cowl 40. The fuselage 10 and the cowl 40 configure an inlet, combustor and nozzle of the jet engine 2, to be mentioned later. The jet engine 2 introduces air in front of the inlet, mixes and combusts the air and the fuel in the combustor, expands the combustion gas in the nozzle, to send out it backwardly. Thus, the jet engine 2 acquires a thrust force.

Next, the jet engine according to the present embodiment will be described.

Figure 6:
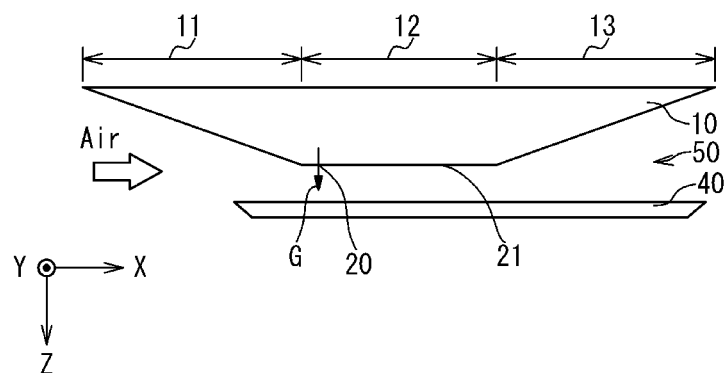
FIG. 6 is a sectional view schematically showing a structural example of the jet engine according to the embodiment.

FIG. 6 is a sectional view schematically showing a structural example of the jet engine according to the present embodiment. The jet engine 2 has the fuselage 10 and the cowl 40 which is provided below the fuselage 10 to form a space 50 where gas can flow. A front lower part of the fuselage 10 and a front part of the cowl 40 configure the inlet 11 which introduces air into the space 50. The middle lower part of the fuselage 10 and the middle part of the cowl 40 configure the combustor 12 which mixes and combusts the fuel and the air. The rear lower part of the fuselage 10 and the rear part of the cowl 40 configure a nozzle 13 which expands and sends out the combustion gas. The combustor 12 has the fuel injectors 20.

The fuel injector 20 is provided on the wall surface 21 of a portion corresponding to the combustor 12 in the lower part of the fuselage 10. The fuel injector 20 injects the fuel G having stored in the fuselage 10 for the space 50 to an almost perpendicular direction (+Z direction). The injected fuel G is mixed with the air taken-in from the inlet 11 and combusted. Also, in the initial stage of the combustion, the fuel G is ignited by an igniter (not shown) and is combusted. The fuel injector 20 has one or plural openings provided in the lower part of the fuselage 10. The fuel injector 20 is supplied with the fuel at a flow rate according to a command of an autopilot. The fuel injector 20 is controlled such that the number of openings which inject the fuel or a cross-section area of a flow path in case of the low-speed is larger than the number of openings which inject the fuel or the cross-sectional area of the flow path in case of the high-speed. However, the shape, the number and the arrangement of openings are optional. The fuel injector 20 is exemplified by the plurality of openings arranged in an array in the span direction of the fuselage 10. Note that it is included in the control of the flow-path cross-section area to control the number of openings injecting the fuel by closing at least one of the plurality of pipes. Also, what portion of the pipe is controlled in the control of the flow-path cross-section area of the pipe is optional. That is, for example, the flow-path cross-section area may be controlled in the openings of the fuel injector of the pipe and the flow-path cross-section area may be controlled in a position apart from the opening of the fuel injector.

Note that the combustor 12 may have a flame stabilizer on the wall surface 21 on a rear side from the fuel injector 20 (not shown).

Figure 7A:
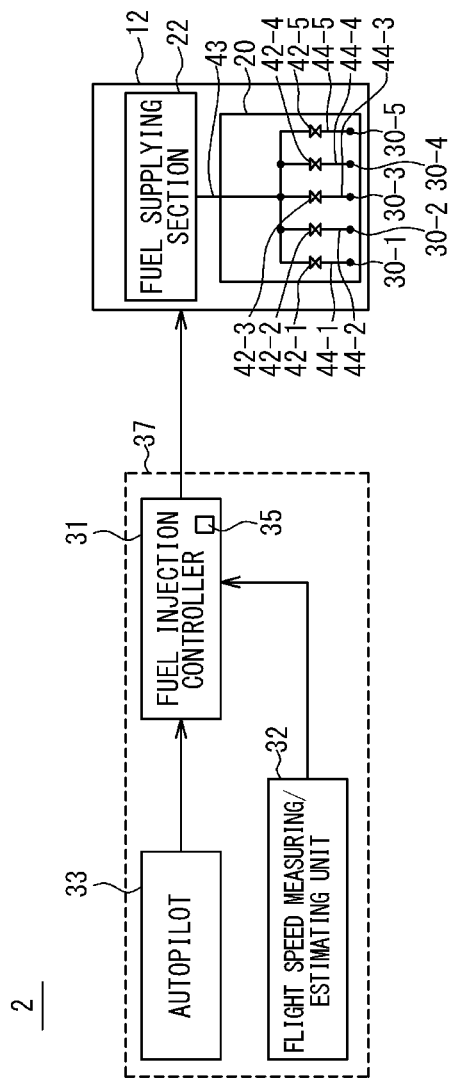
FIG. 7A is a functional block diagram showing an example of the configuration of the jet engine according to the embodiment.

FIG. 7A is a functional block diagram showing a structural example of the jet engine according to the present embodiment. The jet engine 2 has a combustor 12 and a fuel control section 37. The combustor 12 combusts the fuel by using the air taken-in from the inlet 11. The fuel control section 37 controls the supply of the fuel to the combustor 12. The combustor 12 has a fuel supplying section 22 and a fuel injector 20. The fuel supplying section 22 sends out the fuel to the fuel injector 20. The fuel injector 20 injects the supplied fuel into the space 50 in which the air flows.

The fuel injector 20 contains a plurality of fuel injection ports (the openings) 30-1 to 30-5, and a plurality of pipes 43, 44-1 to 44-5 and a plurality of valves 42-1 to 42-5. Note that it is desirable that the plurality of fuel injection ports (the openings) 30-1 to 30-5 are identical in area. Note that in this Specification, the phrase "same area" includes phrase "almost same area". Here, the phrase "almost same area" means that a ratio of the maximum area of the fuel injection ports and the minimum area thereof is 1≤the maximum area/the minimum area≤1.5.

The plurality of pipes 43, and 44-1 to 44-5 supply the fuel sent out from the fuel supplying section 22 to the plurality of fuel injection ports 30-1 to 30-5. Specifically, the pipe 44-1 is connected with one end of the pipe 43 at one end, and is connected with the fuel injection port 30-1 at the other end. The pipe 44-2 is connected with the one end of the pipe 43 at one end and is connected with the fuel injection port 30-2 at the other end. The pipe 44-3 is connected with the one end of the pipe 43 at one end and is connected with the fuel injection port 30-3 at the other end. The pipe 44-4 is connected with the one end of the pipe 43 at one end and is connected with the fuel injection port 30-4 at the other end. The pipe 44-5 is connected with the one end of the pipe 43 at one end and is connected with the fuel injection port 30-5 at the other end. The pipe 43 is connected with the fuel supplying section 22 at the other end.

The plurality of fuel injection ports 30-1 to 30-5 are a plurality of openings provided on the wall surface 21. The plurality of fuel injection ports 30-1 to 30-5 inject the fuel supplied through the plurality of pipes 44-1 to 44-5. The plurality of fuel injection ports 30-1 to 30-5 are arranged in an array in the span direction (almost Y direction) which is a direction perpendicular to a direction of the air flow path. Note that in this Specification, the concept of "perpendicular" includes "almost perpendicular". Also, the concept of "almost perpendicular" includes a perpendicular direction and a range of ±5° with respect to the perpendicular direction (in other words, a range from 85° to 95°). Also, the direction of the air flow path means the longitudinal direction of the combustor (specifically, the X direction which heads for the side of the lower stream from the side of the upper stream with respect to the flow of mainstream air). Also, there is no limitation to the shapes of the plurality of openings, and it may be a circular shape, an ellipsoidal shape, a polygonal shape or a combination of them. Also, the number of fuel injection ports 30 is not restricted. The fuel injection ports 30 are enough to be arranged in almost the Y direction and there is no especial limitation.

The plurality of valves (flow-path cross-section area adjustment sections) 42-1 to 42-5 are provided in middle positions of the plurality of pipes 44-1 to 44-5. Specifically, the valve 42-1 is provided in the middle position of the pipe 44-1. The valve 42-2 is provided in the middle position of the pipe 44-2. The valve 42-3 is provided in the middle position of the pipe 44-3. The valve 42-4 is provided in the middle position of the pipe 44-4. The valve 42-5 is provided in the middle position of the pipe 44-5. Note that the flow-path cross-section area adjustment section may be anything if the flow-path cross-section area is adjustable, and it may be a valve or a mass flow controller which is adjustable in the flow rate of the fuel G, and may be a set of the valve and the mass flow controller.

In this case, by setting each of the five valves (and/or the mass flow controllers) 42-1 to 42-5 to the open/close state, the fuel G can be supplied to the desired fuel injection ports 30 of the five fuel injection ports 30-1 to 30-5. In other words, the flow rate of the fuel injection in the plurality of fuel injection ports 30 can be controlled individually with such a plurality of valves (and/or mass flow controllers). Thus, the plurality of states can be set in which the number of fuel injection ports from which the fuel G is injected is different or the fuel injection flow rate from each fuel injection port is different.

The fuel control section 37 sends a control signal to the fuel supplying section 22 and the plurality of valves (and/or mass flow controllers) 42-1 to 42-5 of the combustor 12 to control the fuel supplying section 22 and the plurality of valves. For example, the fuel control section 37 controls the fuel supplying section 22 such that in the stage that the flight speed has reached a predetermined speed, the fuel supplying section 22 send out the fuel of a total flow rate according to a command of an autopilot compulsorily to the fuel injector 20. For example, the fuel supplying section 22 has a pump which sends out the total flow rate of fuel according to the autopilot command compulsorily to the fuel injector 20. In addition, for example, the fuel control section 37 controls the valves 42-1 to 42-5 such that the valves 42-1 to 42-5 are set to the open state in case of the low-speed, and the valves 42-1 and valve 42-5 are set to the open state and the valve 42-2 to 42-4 are set to the close state in case of the high-speed. However, the control of the valves 42-1 to 42-5 is not limited to the above-mentioned example. Note that it is desirable that the control of the fuel supplying section 22 is independent from the control of the valves 42-1 to 42-5. That is, it is desirable that the control of the valves 42-1 to 42-5 has no relation to the control of the total flow rate of fuel.

The fuel control section 37 has an autopilot 33, a fuel injection controller 31, and the flight speed measuring/estimating unit 32. The autopilot 33, the fuel injection controller 31, and the flight speed measuring/estimating unit 32 may be independent computers (note that each computer may be an independent computer (note that for example, each computer has a hardware processor, a memory, and a communication interface)). Note that the autopilot 33 and the flight speed measuring/estimating unit 32 may be provided outside the fuel control section 37.

Alternatively, the autopilot 33, the fuel injection controller 31, and the flight speed measuring/estimating unit 32 may be configured by one computer. When it is configured by a single computer, for example, the fuel control section 37 is one computer which has a hardware processor, a memory, and a communication interface. In this case, the hardware processor executes a software program having been stored in the memory, to make the fuel control section 37 function as an autopilot (automatic operation command unit), the flight speed measuring unit (or the flight speed estimating unit or the flight speed measuring estimating unit), the fuel injection controller.

The flight speed measuring/estimating unit 32 measures or estimates the flight speed of the jet engine 2. The flight speed measuring/estimating unit 32 is a Pitot tube in case of the flight speed measuring equipment. When the flight speed measuring/estimating unit 32 is an estimator 32, it is a GPS unit or an inertial navigation system. The speed is estimated through the time change of its own position in case of the GPS unit, and through the integration of its own acceleration in case of the inertial navigation system.

The fuel control section 37 controls the fuel injection controller 31 based on the total flow rate of fuel indicated from the autopilot 33, data of the flight speed measuring/estimating unit 32, data of an altitude sensor (not shown), data of another sensor (not shown) and so on.

Note that the total flow rate of fuel is determined as follows. As for a specific flying object or a specific jet engine, an air inflow quantity taken-in from the inlet 11 can be determined based on the flight altitude (data of an altitude sensor) and the flight speed (data of the flight speed measuring/estimating unit 32). For example, the fuel control section 37 is configured to determine the air inflow quantity from the flight altitude and the flight speed. Or, the memory of the fuel control section 37 stores a table that relates the flight altitude, the flight speed and the air inflow quantity, and the fuel control section 37 refers to the table to determine the air inflow quantity. On the other hand, the thrust force required for the jet engine according to a speed command, an acceleration command and so on from the autopilot 33 is determined. The fuel control section 37 may determine the thrust force through calculation. The fuel of the total flow rate to be supplied to the combustor 12 can be determined from the thrust force, the flight speed, the flight altitude, the air inflow quantity and so on. For example, the total flow rate of fuel is determined through calculation by the fuel control section 37.

The fuel injection controller 31 controls the fuel supplying section 22 and the plurality of valves 42-1 to 42-5 in the combustor 12 based on a control signal from the autopilot 33, the data of the flight speed measuring/estimating unit 32, the data of the altitude sensor and so on. The fuel injection controller 31 is exemplified by a microcomputer. For example, the fuel injection controller 31 instructs the total flow rate of fuel to be sent out, to the fuel supplying section 22 based on the control signal from the autopilot 33. In response to the instruction, the fuel supplying section 22 sends out the fuel. Also, the fuel injection controller 31 controls the open/close state or an opening degree of each of the plurality of valves 42-1 to 42-5 based on the total flow rate of fuel, and/or the data of the flight speed measuring/estimating unit 32, the data of the altitude sensor. When the open/close state or the opening degree of each of the plurality of valves 42-1 to 42-5 is controlled, the fuel injection controller 31 may refer to a table 35 stored in a storage section of the fuel injection controller 31 and indicating an open/close state or the opening degree of each valve. The control of the open/close state or the opening degree of each of the plurality of valves 42-1 to 42-5, and the table 35 are mentioned later.

Figure 7B:
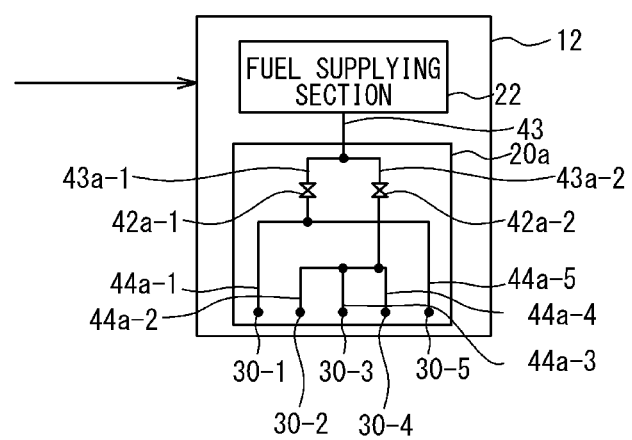
FIG. 7B is a functional block diagram showing another example of the configuration of the fuel injector of the jet engine according to the embodiment.

Note that the pipes and the valves in the fuel injector 20 are not limited to the above structure. FIG. 7B is a functional block diagram showing another structural example of the fuel injector of the jet engine according to the present embodiment. The fuel injector 20a has the plurality of fuel injection ports 30-1 to 30-5, a plurality of pipes 43, 43a-1, 43a-2, and 44a-1 to 44a-5, and a plurality of valves 42a-1 to 42a-2.

The pipe 44a-1 is connected with one end of the pipe 43a-1 at one end and is connected with the fuel injection port 30-1 at the other end. The pipe 44a-5 is connected with one end of the pipe 43a-1 at one end and is connected with the fuel injection port 30-5 at the other end. The pipe 44a-2 is connected with one end of the pipe 43a-2 at one end and is connected with the fuel injection port 30-2 at the other end. The pipe 44a-3 is connected with one end of the pipe 43a-2 at one end and is connected with the fuel injection port 30-3 at the other end. The pipe 44a-4 is connected with one end of the pipe 43a-2 at one end and is connected with the fuel injection port 30-4 at the other end. The pipe 43a-1 is connected with one end of the pipe 43 at the other end. The pipe 43a-2 is connected with one end of the pipe 43 at the other end. The other end of the pipe 43 is connected with the fuel supplying section 22. The valve 42a-1 is provided on the way of the pipe 43a-1, and the valve 42a-2 is provided on the way of the pipe 43a-2.

In this case, the number of valves decreases. However, by setting the two valves 42a-1 and 42a-2 to the open state, the fuel G is supplied to the five fuel injection ports 30-1 to 30-5. By closing the valve 42a-1, the fuel G is supplied to the three fuel injection ports 30-2 to 30-4 at the center. The supply of the fuel G to the two fuel injection ports 30-1 and 30-5 on both sides can be stopped. That is, by switching the two valves 42a-1 and 42a-2, at least two states can be made possible. The number of valves 42a to use can be made little.

Figure 8A:
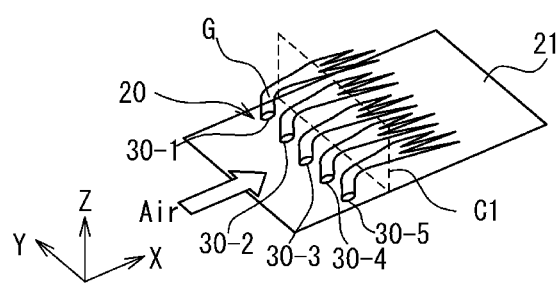
FIG. 8A is a diagram schematically showing the state of the fuel injection when the flight speed is slow in the combustor according to the embodiment.
Figure 8B:
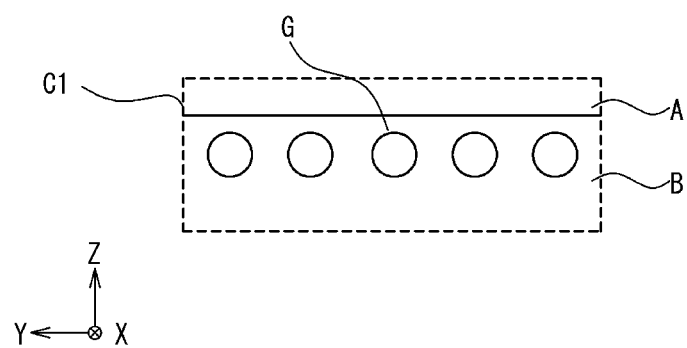
FIG. 8B is a diagram schematically showing the state of the fuel injection when the flight speed is slow in the combustor according to the embodiment.

FIG. 8A and FIG. 8B are diagrams schematically showing the state of the fuel injection when the flight speed is slow in the combustor according to the present embodiment. However, FIG. 8A is a perspective view showing the neighborhood of the openings of the fuel injector 20. FIG. 8B is a diagram showing the state of the fuel G in the cross-section C1 of FIG. 8A. Also, the cross-section C1 is an YZ section in the position apart by a predetermined distance in the flow direction from the fuel injector 20 in the flow path of air Air and the fuel G.

In the fuel injector 20, the fuel supplying section 22 sends out the fuel G to the pipe 43 based on the control signal from the fuel control section 37. The plurality of valves (flow-path cross-section area adjustment section) 42-1 to 42-5 are set to the open state based on the control signal from the fuel control section 37. The plurality of fuel injection ports (the openings) 30-1 to 30-5 are supplied with the fuel G through the plurality of pipes 44-1 to 44-5. As shown in FIG. 8A, the plurality of fuel injection ports (the openings) 30-1 to 30-5 inject the supplied fuel G to the space 50. At this time, the fuel G is injected from the five fuel injection ports 30.

In the present embodiment, the fuel G is sent out from the fuel supplying section 22 in the total flow rate of fuel (the total flow rate of mass) according to the command of the autopilot. When the speed of the flying object 1 is low (mainly, in an accelerating stage), the fuel G is injected from the five fuel injection ports 30-1 to 30-5. In this case, because the number of the fuel injection ports which inject the fuel G is relatively many, the injection speed and/or density of the fuel G which is injected from one fuel injection port 30, furthermore, the momentum flux decreases relatively. Thus, the penetration height of the fuel G can be suppressed low. As a result, when the speed of the flying object 1 is slow, and the momentum flux of air Air is small, the situation shown in FIG. 4A and FIG. 4B does not occur. As a result, as shown in FIG. 8B, in the cross-section C1 (YZ section), the fuel G passes through the flame stabilization possible region B, and it is restrained to pass through the flame stabilization difficult region A.

Figure 9A:
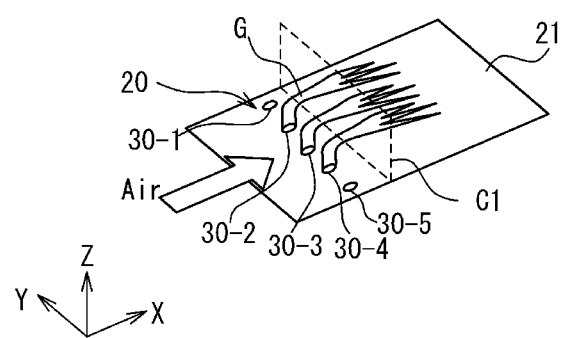
FIG. 9A is a diagram schematically showing the state of the fuel injection when the flight speed is fast in the combustor according to the embodiment.
Figure 9B:
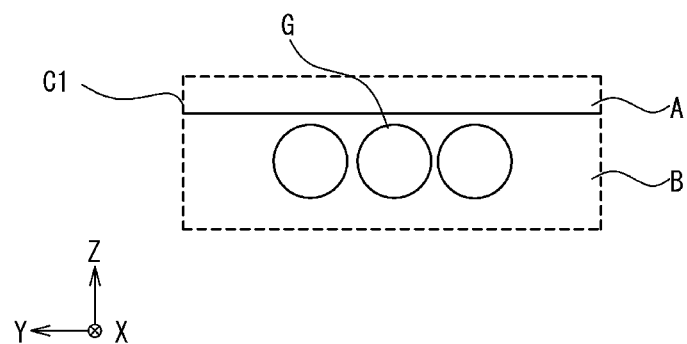
FIG. 9B is a diagram schematically showing the state of the fuel injection when the flight speed is fast in the combustor according to the embodiment.

On the other hand, FIG. 9A and FIG. 9B are diagrams schematically showing the state of the fuel injection when the flight speed is fast in the combustor according to the present embodiment. However, FIG. 9A is a perspective view showing the neighborhood of the openings of the fuel injector 20. FIG. 9B is a diagram showing the state of the fuel G in the cross-section C1 of FIG. 9A.

In the fuel injector 20, the fuel supplying section 22 sends out the fuel G to the pipe 43 based on the control signal from the fuel control section 37. The plurality of valves 42-2 to 42-4 are set to the open state based on the control signal from the fuel control section 37. On the other hand, the plurality of valves 42-1 and 42-5 are set to the close state based on the control signal from the fuel control section 37. As a result, the plurality of fuel injection ports (openings) 30-2 to 30-4 are supplied with the fuel G through the plurality of pipes 44-2 to 44-4. As shown in FIG. 9A, the plurality of fuel injection ports (openings) 30-2 to 30-4 inject the supplied fuel G to the space 50. On the other hand, because the plurality of fuel injection ports (openings) 30-1 and 30-5 are not supplied with the fuel G, the supplied fuel G is never injected to the space 50, as shown in FIG. 9A. At this time, the fuel G is injected from the three fuel injection ports 30.

In the present embodiment, the fuel G is sent out from the fuel supplying section 22 in the total flow rate of fuel (the total flow rate of mass) according to the command of the autopilot. When the speed of the flying object 1 is fast (mainly, in the cruising stage), the fuel G is injected from the three fuel injection ports 30-2 to 30-4. In this case, because the number of fuel injection ports 30 which inject the fuel G is relative little, the injection speed and/or density of the fuel G which is injected from one fuel injection port 30, furthermore, the momentum flux increases relatively. Thus, even when the momentum flux of air Air is large, the penetration height of the fuel G can be maintained. As a result, when the speed of the flying object 1 is fast and the momentum flux of air Air is large, the fuel G can pass through the flame stabilization possible region B in the cross-section C1 (the YZ cross-section), as shown in FIG. 9B.

In the present embodiment, the fuel is injected from many fuel injection ports 30 in case of the low-speed and the fuel is injected from the small number of fuel injection ports 30 in case of the high-speed. In other words, this can be expressed as a summation of the cross-section areas of the plurality of fuel injection ports 30 is increased in the low-speed, and the summation of the cross-section areas of the plurality of fuel injection ports 30 is decreased in the high-speed. Or, the summation of flow-path cross-section areas of the plurality of flow-path cross-section area adjustment sections (the plurality of valves 42) is increased in case of the low-speed. The summation of flow-path cross-section areas of the plurality of flow-path cross-section area adjustment sections (the plurality of valves 42) is decreased in case of the high-speed. When applying this idea, the valves 42-1 to 42-5 are set to the open state in case of the low-speed and the valves 42-1 and 42-5 are not fully set to the close state in case of the high-speed but are set to the state opened by a little angle. In this way, when the summation of the flow-path cross-section areas of the plurality of valves 42 (a summation of the opening degrees) is made small, the same state as in the above embodiment can be reproduced. Thus, the injection is suppressed so as for the penetration height not to become high in case of the low-speed, and the fuel G is supplied to the flame stabilization possible region B and can be diffused, even when the momentum flux of air Air is small. In addition, the injection is controlled so as for the penetration height not to become low in case of the high-speed, and the fuel G is supplied to the flame stabilization possible region B and can be diffused, even when the momentum flux of air Air is large. Thus, the situation that the jet engine 2 does not operate can be prevented.

Next, an example when a summation of flow-path cross-section areas is controlled will be described. The fuel control section 37 determines the total flow rate of fuel to be sent out to the fuel injector 20 based on the command of the autopilot. The fuel control section 37 controls the fuel supplying section 22 to send out the total flow rate of fuel. In addition, the fuel control section 37 determines "the summation of flow-path cross-section areas" of the plurality of flow-path cross-section area adjustment sections (the plurality of valves 42) based on the total flow rate of fuel and the momentum flux of the mainstream air which passes through the combustor 12 (when it is difficult to measure or calculate the momentum flux of air, "the airspeed of the jet engine" or "the airspeed and air-altitude of the jet engine" can be used instead of the momentum flux of air). Here, "the summation of flow-path cross-section areas" is determined for the fuel G to pass through the flame stabilization possible region B. Note that the flow-path cross-section area is a cross-section area when the flow-path cross-section area is set to the smallest by the flow-path cross-section area adjustment section. Note that when some of the pipes 44-1 to 44-5 have no flow-path cross-section area adjustment sections, the flow-path cross-section areas of the pipes having no flow-path cross-section area adjustment sections are supposed to be equal to the cross-section areas of the pipes. Then, the fuel control section 37 controls the flow-path cross-section areas of the plurality of flow-path cross-section area adjustment sections (the plurality of valves 42) so as to realize the determined "summation of flow-path cross-section areas". Note that the control may be carried out so that the flow-path cross-section areas are same, or may be carried out so that the cross-section areas of the valves 42-1 and 42-5 are larger than those of the valve 42-2 to 42-4, resulting in the flow-path cross-section areas to be different.

As such, by controlling the total flow rate of fuel and each flow-path cross-section area, the injection speed and density of the fuel G which is injected from each of the fuel injection ports 30-1 to 30-5, the momentum flux of fuel or the penetration height of fuel are controlled, and the fuel G passes through the flame stabilization possible region B.

Alternatively, an aperture shutter (not shown) is provided for each fuel injection port 30, and the momentum flux of the fuel which is injected from the fuel injection port 30 may be adjusted continuously by squeezing the shutter continuously. In this case, each shutter becomes the flow-path cross-section area adjustment section.

Next, an example of a method of operating the jet engine 2 and the flying object 1 according to the embodiment will be described.

The flying object 1 is launched for a target from a setting position. When the flying object 1 is launched from the launcher, the rocket motor 3 accelerates the flying object 1 from a speed at the time of flight start to a desired speed. However, the speed at the time of flight start is zero when the flying object 1 is launched from a stationary launcher. When the flying object is launched from the launcher of a moving vehicle (or a flight body) in the traveling (or the flying), the speed at the time of flight start is the traveling speed (or the flight speed) of the moving vehicle (or the flight body). After that, the flying object 1 detaches the rocket motor 3 based on the control the autopilot 33, and is accelerated by the jet engine 2 to continue to fly.

At a step of beginning to accelerate by the jet engine 2 (in case of acceleration), the speed of the flying object 1 is slow relatively. The speed of the flying object 1 is acquired from the flight speed measuring/estimating unit 32 by the fuel injection controller 31. The fuel injection controller 31 determines which of the five valves 42-1 to 42-5 are to be opened, based on the speed of the flying object 1. For example, the fuel injection controller 31 refers to the table 35 based on the speed of the flying object 1, to determine which of the five valves 42-1 to 42-5 are to be opened.

FIG. 10 shows an example of the table 35 indicative of the relation of the speed of the flying object and the opening/closing of each valve by the fuel injection controller 31. Here, a circle (◯) mark shows to set the valve 42 to the open state and a cross (×) mark shows to set the valve 42 to the close state. "1" to "5" are equivalent to "30-1" to "30-5". When the speed of the flying object 1 is less than a predetermined speed $v_0$, as shown in table 35, the valves 42-1 to 42-5 are set to the open state. When the speed of the flying object 1 is equal to or more than the predetermined speed $v_0$, the valves 42-1 and 42-5 are set to the close state and the remaining valves 42-2, 42-3, and 42-4 remain in the open state. Note that this table 35 is an example, and the open/close state pattern of the valves 42 and the number of steps are not limited to this example. The predetermined speed $v_0$ is determined based on the design of the flying object 1.

It is supposed that the speed of the flying object 1 is relatively slow, and is less than the predetermined speed $v_0$. In this case, the fuel injection controller 31 refers to the table 35 to set the five valves 42-1 to 42-5 of the fuel injector 20 to the open state, and the fuel supplying section 22 supplies the fuel G to the five fuel injection ports 30-1 to 30-5. In this case, because the number of fuel injection ports 30 which inject the fuel G is relatively many, the flow rate of the fuel G which is injected from one fuel injection port 30 is small, and the momentum flux of fuel decreases relatively. Thus, the penetration height of the fuel G is suppressed low, the change of the flow path of the fuel G to the flame stabilization difficult region A is suppressed, and the fuel is supplied to the flame stabilization possible region B. Therefore, the jet engine 2 can carry out the flame stabilization and can continue the operation (FIG. 8A and FIG. 8B).

It is supposed that the speed of the flying object 1 increases through the acceleration of the jet engine 2, so that the speed of the flying object 1 becomes sufficiently fast (mainly, in the cruising stage). The speed of the flying object 1 is relatively fast and becomes equal to or more than the predetermined speed $v_0$. In such a case, the table 35 is referred to maintain the three valves 42-2 to 42-4 of the fuel injector 20 in the open state, and to set the two valves 42-1 and 42-5 to the close state. The fuel supplying section 22 supplies the fuel G to the three fuel injection ports 30-2 to 30-4. In this case, because the number of fuel injection ports 30 which inject the fuel G is relatively less, the flow rate of the fuel G which is injected from one fuel injection port 30 becomes large, and the momentum flux of fuel relatively increases. Thus, the penetration height of the fuel G is almost not changed, a change of the flow path of the fuel G to the flame stabilization difficult region A is suppressed, and the fuel is supplied to the flame stabilization possible region B. Therefore, the jet engine 2 can carry out the flame stabilization and can continue the operation (FIG. 9A and FIG. 9B).

As mentioned above, the flying object 1 and the jet engine 2 according to the embodiment operate.

Figure 11A:
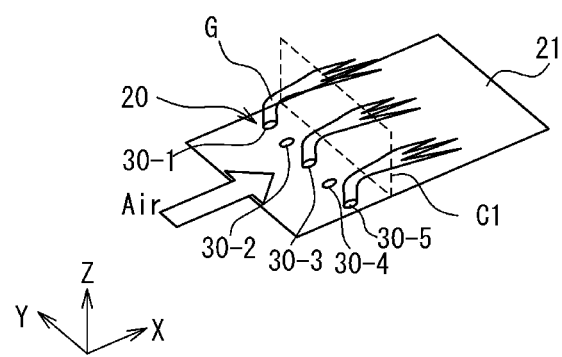
FIG. 11A is a diagram schematically showing the state of a modification example of the fuel injection when the flight speed is fast in the combustor according to the embodiment.
Figure 11B:
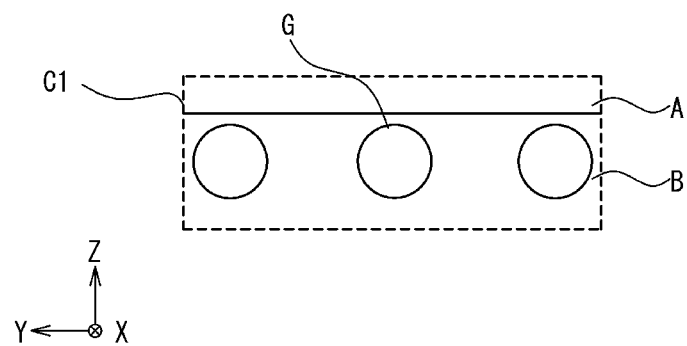
FIG. 11B is a diagram schematically showing the state of a modification example of the fuel injection when the flight speed is fast in the combustor according to the embodiment.

FIG. 11A and FIG. 11B are diagrams schematically showing the state of a modification example of the fuel injection when the flight speed is fast, in the combustor according to the present embodiment. Here, FIG. 11A is a perspective view showing the neighborhood of the openings of the fuel injector 20. FIG. 11B is a diagram showing the state of the fuel G in the cross-section C1 in FIG. 11A. Note that the states when the flight speed is slow are the same as FIG. 8A and FIG. 8B.

In this modification example, when the flight speed is fast, the plurality of valves 42-1, 42-3, and 42-5 are set to the open state in the fuel injector 20 based on the control signal from the fuel control section 37. On the other hand, the plurality of valves 42-2 to 42-4 are set to the close state based on the control signal from the fuel control section 37. As a result, the plurality of fuel injection ports (the openings) 30-1, 30-3, and 30-5 are supplied with the fuel G through the plurality of pipes 44-1, 44-3, and 44-5. As shown in FIG. 11A, the plurality of fuel injection ports (the openings) 30-1, 30-3, and 30-5 inject the supplied fuel G to the space 50. On the other hand, because the plurality of fuel injection ports (the openings) 30-2 and 30-4 are not supplied with the fuel G, there is no case where the supplied fuel G is injected to the space 50 as shown in FIG. 11A. At this time, the fuel G is injected from the three fuel injection ports 30.

When the speed of the flying object 1 is fast (mainly in the cruising stage), the fuel G is injected from the three fuel injection ports 30-1, 30-3, and 30-5. In this case, because the number of the fuel injection ports 30 which inject the fuel G is relatively less, the flow rate of the fuel G which is injected from one fuel injection port 30 becomes more, and the momentum flux of fuel increases relatively. As a result, even if the momentum flux of air Air is large, it is possible to maintain the penetration height of the fuel G. As a result, when the speed of the flying object 1 is fast and the momentum flux of air Air is large, the fuel G can pass through the flame stabilization possible region B in the cross-section C1 (YZ section), as shown in FIG. 11B. In this case, comparing with the case of FIG. 9B, it is possible to diffuse the fuel G of a less quantity into a wider range. Also, the fuels G injected on both sides are away from the fuel G at the center so that the air becomes easy to flow between the fuels. Thus, the fuel and the air are mixed more efficiently.

When the injection of the fuel G is realized as shown in FIG. 11A and FIG. 11B, the table 35 of FIG. 10 must be changed. FIG. 12 shows another example of the table 35 showing relation of the speed of the flying object and the opening/closing of the valves by the fuel injection controller 31. Comparing with the case of FIG. 10, the present case is different from the case of FIG. 10 in that the valves 42-2 to 42-4 are set to the close state and the other valves 42-1, 42-3, and 42-5 remain in the open state, when the speed of the flying object 1 is equal to or more than the predetermined speed $v_0$. The injection of the fuel G like FIG. 11A and FIG. 11B is realized based on the table 35 of FIG. 12.

In the flying object 1 and the jet engine 2 according to the present embodiment, the number of fuel injection ports 30 which inject the fuel G increases relatively in the low speed stage in which the acceleration of the jet engine 2 is started (mainly in the accelerating stage). Thus, the fuel flow rate of one fuel injection port 30 can be reduced and the momentum flux of the fuel G can be suppressed low. Therefore, even in case of the low-speed, the penetration height of fuel is suppressed so as not to become high, and the fuel G is supplied to the flame stabilization possible region B, to make it possible to diffuse the fuel G. Thus, the situation that the jet engine 2 does not operate can be prevented.

Moreover, the speed of the flying object 1 rises to the high speed stage (mainly in the cruising stage), the number of fuel injection ports 30 which inject the fuel G decreases relatively. Thus, the fuel flow rate for one fuel injection port 30 is increased and the momentum flux of the fuel G can be made high. Therefore, in case of the high-speed, the penetration height of fuel can be maintained, and the fuel G is supplied to the flame stabilization possible region B to make it possible to diffuse the fuel. Thus, it is possible to operate the jet engine 2 continuously.

In this way, in the present embodiment, the speed range can be made very wide in which the penetration height of fuel can be maintained at a same level without depending on the flight speed, in the state that the total of flow rates of fuel G from the fuel injector 20 almost constant. Thus, in the very wide speed range, the continuous supply of the fuel to the flame stabilization possible region can be made possible.

As a result, in the flying object 1 and the jet engine 2 according to the present embodiment, the flame stabilizer can be realized which is usable in the very wide speed range from the low-speed state to the high-speed state, compared with the conventional jet engine. That is, the speed range in which it is possible to operate the jet engine 2 can be increased.

Note that in the present embodiment, the plurality of valves 42 are set to the open state in the low-speed state so that the number of fuel injection ports 30 injecting the fuel increases. Some of the plurality of valves 42 in the open state are set to the close state in case of the high-speed state so that the number of fuel injection ports 30 injecting the fuel decreases. However, the present embodiment is not limited to this example. If the number of fuel injection ports 30 injecting the fuel in case of the low-speed state is more than the number of fuel injection ports 30 injecting the fuel in case of the high-speed state, any configuration may be allowed. In other words, if the number of valves 42 through which the fuel can be passed in case of the low-speed is more than the number of valves 42 through which the fuel can be passed in case of the high-speed, any modification will be allowed. For example, supposing that there are 10 valves 42 (they are identified as 42-1 to 42-10 in order from the end), the valves 42-1, 42-2, 42-5, 42-6, 42-9, and 42-10 are set to the open state and the other valves 42 are set to the close state, in the low-speed stage, and the valves 42-3, 42-4, 42-7, and 42-8 are set to the open state and the other valves 42 are set to the close state in the high-speed state.

Figure 13A:
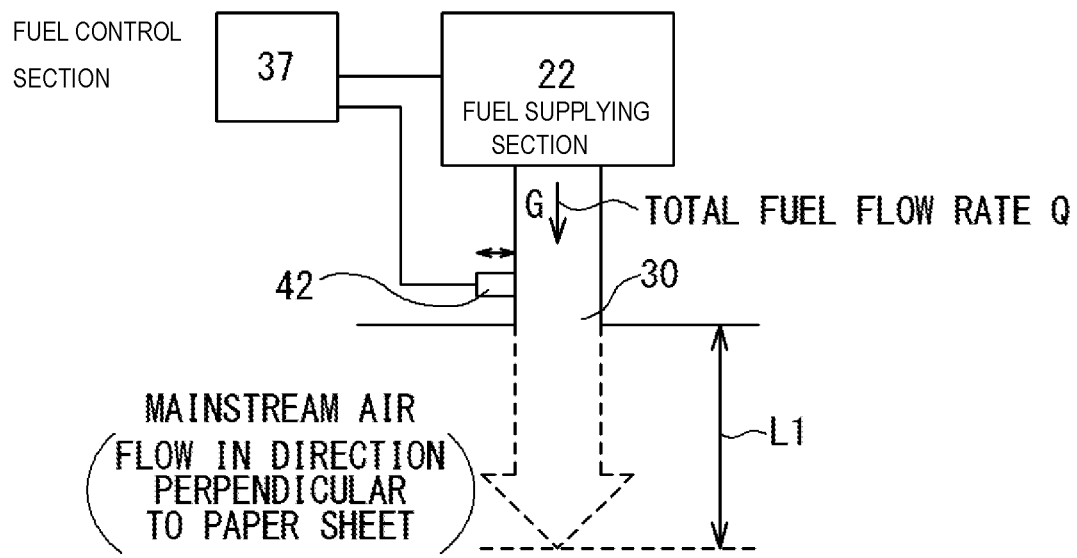
FIG. 13A is a sectional view schematically showing a jet engine according to a modification example of the embodiment when the fuel injection port is single, to show a section perpendicular to a mainstream air flow passing through the jet engine when the valve is fully opened.
Figure 13B:
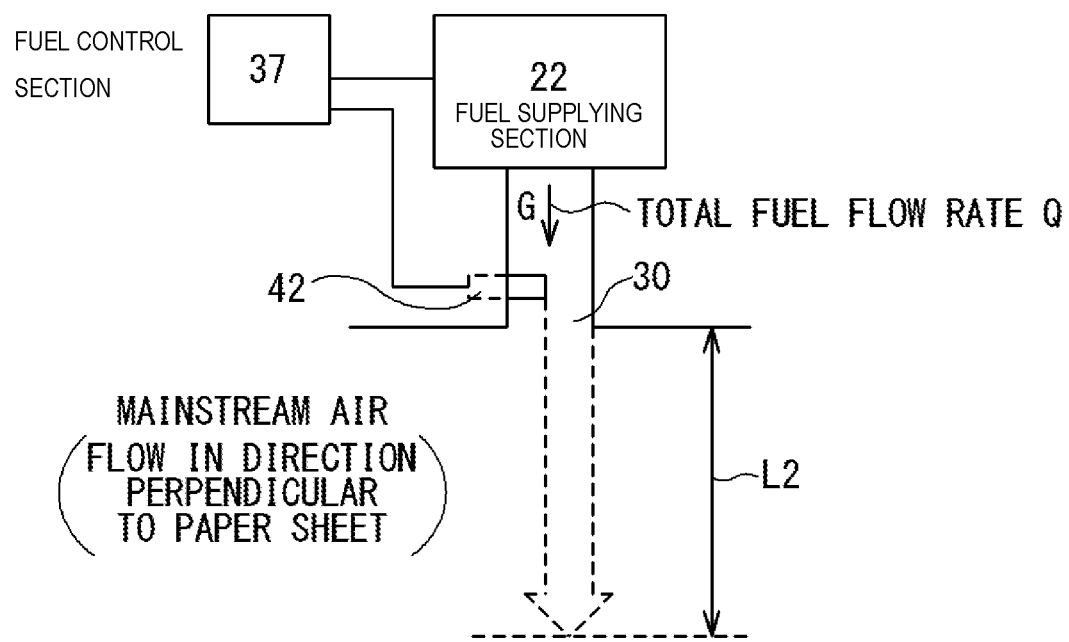
FIG. 13B is a sectional view schematically showing a jet engine according to the modification example of the embodiment when the fuel injection port is single, to show a section perpendicular to the mainstream air flow passing through the jet engine when the opening of the valve is narrowed.

Also, in a modification example of the present embodiment, the fuel injection port 30 may be one. For example, the fuel injection port 30 may be a slit-shaped injection port long in the span direction of the jet engine (the width direction). FIG. 13A and FIG. 13B are sectional views showing an example of the jet engine having one fuel injection port 30, and show the sectional views perpendicular to the mainstream air which passes the jet engine. Note that FIG. 13A is the sectional view when the valve 42 is fully opened, and FIG. 13B is the sectional view when the opening degree of the valve 42 is constrained. Also, in FIG. 13A and FIG. 13B, the fuel control section 37, the fuel supplying section 22, the valves (the flow-path cross-section area adjustment sections) 42, the fuel injection port 30, the penetration heights L1 and L2 of fuel are shown.

A case will be considered where in FIG. 13A and FIG. 13B, the total flow rate Q of fuel of FIG. 13A is identical with the total flow rate Q of fuel of FIG. 13B, and a case that the momentum flux of the mainstream air of FIG. 13A is identical with the momentum flux of the mainstream air of FIG. 13B. When the valve 42 is squeezed so as to reduce the flow-path cross-section area to be changed to the state of FIG. 13B from the state of FIG. 13A, the penetration height of the fuel G increases from L1 to L2.

From this, it could be understood that the following control is desirable. That is, as the flight speed increases or as the flight altitude decreases, that is, as the momentum flux of mainstream air increases, the fuel injection speed and/or the density and/or the momentum flux of the fuel are increased by narrowing down the flow-path cross-section area with the valve 42, to keep the penetration height of the fuel G (the penetration height of fuel when the fuel G passes through the flame stabilization possible region B). Also, it could be understood that the following control is desirable in an opposite case. That is, as the flight speed decreases or as the flight altitude increases, that is, as the momentum flux of mainstream air decreases, the fuel injection speed and/or the density and/or the momentum flux of the fuel is decreased by increasing the flow-path cross-section area with the valve 42, to keep the penetration height of the fuel G (the penetration height when the fuel G passes through the flame stabilization possible region B).

As mentioned above, even when the momentum flux of air Air is small and even when the momentum flux of air Air is large, the fuel G can be supplied to the flame stabilization possible region B and can be diffused. Thus, it is possible to operate the jet engine 2 stably.

Also, in the present embodiment, because the speed range for the jet engine 2 to be possible to operate is increased in the flying object 1 which uses the rocket motor 3 before operating the jet engine 2, the speed of the flying object 1 to be reached with the rocket motor can be made small (the speed to be reached through the acceleration). Therefore, the size (the weight) of the rocket motor 3 can be substantially reduced. Thus, the small-size and light-weight can be realized as whole flying object 1, and the acceleration performance can be further improved.

The flying object, the aircraft, and the rocket often have a flight speed measuring/estimating unit. Therefore, when the present embodiment is applied to the above fuselages, it is suitable because the addition of the unit is suppressed at a minimum.

The present invention can provide a jet engine, a flying object and a method of operating the jet engine, which can operate stably even in case of lower-speed. Also, optionally and additionally, the present invention can provide a jet engine, a flying object and a method of operating the jet engine, which it can be suppressed for the fuel to reach the flame stabilization difficult region.

These embodiments have been described by using an example where the jet engine is applied to the flying object. However, the embodiments are not limited to the examples and it is possible to apply to a multi-stage launch vehicle and aircraft having a rocket and a jet engine.

The present invention is not limited to each of the above embodiments, and it would be apparent that each of the embodiments can be changed or modified appropriately in the range of the technical thought of the present invention. Also, unless the technical contradiction is caused, various technique used in the embodiments or the modification examples can be applied to another embodiment or another modification example.

This application is based on Japanese Patent Application No. JP 2014-74491, which was filed on Mar. 31, 2014, and claims a priority based on that Patent Application. The disclosure thereof is incorporated herein by reference.

The invention claimed is:

1. A jet engine comprising:
   an inlet configured to take in air;
   a combustor configured to combust fuel by using the air; and
   a computer configured to control supply of the fuel,
   wherein the combustor comprises:
   a pump configured to supply the fuel;
   an injector having an opening configured to inject the fuel supplied from the pump;
   a pipe configured to send the fuel from the pump to the opening; and
   a valve configured in the pipe and positioned perpendicular to the direction of fuel flow in the pipe,
   wherein the computer is configured to control the pump in response to a command of an autopilot to supply a total flow rate of the fuel to the injector,
   wherein the computer is configured to increase a momentum flux of the fuel based on increasing an airspeed of the jet engine or decreasing an altitude of the jet engine by changing a cross-section area of the pipe by the valve,
   wherein the computer is configured to adjust the cross-section area of the pipe using the valve, which controls a penetration height of the fuel, to increase the momentum flux of the fuel, and
   wherein the computer controls the valve to change the cross-section area of the pipe while maintaining the total flow rate of the fuel to control the penetration height of the fuel.

2. The jet engine according to claim 1, wherein the computer is configured to control the penetration height of the fuel such that the fuel passes through a flame stabilization possible region.

3. The jet engine according to claim 1, wherein the injector has a plurality of said openings injecting the fuel, wherein the injector comprises:

a plurality of said pipes configured to send out the fuel from the pump to the plurality of said openings; and a plurality of said valves provided on a way of at least some of the plurality of said pipes, and the computer is configured to control the plurality of said valves to control the penetration height of the fuel.

4. The jet engine according to claim 3, wherein the plurality of said openings are arranged in an array in a direction perpendicular to a direction of a flow path of the air.

5. The jet engine according to claim 3, wherein the computer controls at least one of the plurality of said valves to be set to a close state, such that a number of the plurality of said openings that inject the fuel decrease when the airspeed of the jet engine increases.

6. The jet engine according to claim 3, wherein the plurality of said openings are same in area.

7. The jet engine according to claim 3, wherein the computer is configured to control an open or close state of each of the plurality of said valves in a high-speed stage, such that the fuel is injected from one of every adjacent two of the plurality of said openings.

8. A flying object comprising:
a jet engine which comprises:
an inlet configured to take in air,
a combustor configured to combust fuel by using the air,
a computer configured to control supply of the fuel; and
a rocket motor connected with the jet engine;
wherein the combustor comprises:
a pump configured to supply the fuel;
an injector having an opening configured to inject the fuel supplied from the pump;
a pipe configured to send the fuel from the pump to the opening; and
a valve configured in the pipe and positioned perpendicular to the direction of fuel flow in the pipe;
wherein the computer is configured to control the pump in response to a command of an autopilot to supply a total flow rate of the fuel to the injector;
wherein the computer is configured to increase a momentum flux of the fuel based on increasing an airspeed of the jet engine or decreasing an altitude of the jet engine by changing a cross-section area of the pipe by the valve;

wherein the computer is configured to adjust the cross-section area of the pipe using the valve, which controls a penetration height of the fuel, to increase the momentum flux of the fuel; and wherein the computer controls the valve to change the cross-section area of the pipe while maintaining the total flow rate of the fuel to control the penetration height of the fuel.

9. A method of operating a jet engine which comprises:
an inlet configured to take in air;
a combustor configured to combust fuel by using the air; and
a computer configured to control supply of the fuel, wherein the combustor comprises:
a pump configured to supply the fuel;
an injector having an opening configured to inject the fuel supplied from the pump;
a pipe through which the fuel is sent out from the pump to the opening; and
a valve configured in the pipe and positioned perpendicular to the direction of fuel flow in the pipe, wherein the method of operating the jet engine comprises:
supplying, by the pump, the fuel to the injector in a total flow rate of the fuel in response to a command of an autopilot;
increasing a momentum flux of the fuel based on increasing an airspeed of the jet engine or decreasing an altitude of the jet engine by changing a flow-path cross-section area of the pipe by the valve;
adjusting the flow-path cross-section area of the pipe using the valve, which controls a penetration height of the fuel, to increase to increase the momentum flux of the fuel; and
adjusting the flow-path cross-section area of the pipe while maintaining the total flow rate of the fuel to control the penetration height of the fuel.

* * * * *